US006536333B2

(12) United States Patent
Bouly et al.

(10) Patent No.: US 6,536,333 B2
(45) Date of Patent: Mar. 25, 2003

(54) ELECTRIC COOKING APPLIANCE HAVING AN ELECTRIC CONNECTOR AT THE OUTSIDE OF THE CASING

(75) Inventors: Bernard Bouly, Dijon (FR); Céline Sobole, Dijon (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/105,814

(22) Filed: Mar. 21, 2002

(65) Prior Publication Data

US 2002/0152897 A1 Oct. 24, 2002

(30) Foreign Application Priority Data

Mar. 21, 2001 (FR) .............................. 01 03850

(51) Int. Cl.⁷ .............................. A23L 1/00; A47J 27/08; A47J 27/62; A47J 37/12; H01H 37/32
(52) U.S. Cl. .......................... 99/403; 99/330; 219/429; 219/432; 219/433; 219/435; 219/442
(58) Field of Search .................. 99/327–333, 337, 99/338, 403–417, 492, 422–425; 219/430, 442, 432, 433, 436, 435, 429, 438–441, 489, 491–493, 494, 497, 507; 307/139–141

(56) References Cited

U.S. PATENT DOCUMENTS

| | | | | | |
|---|---|---|---|---|---|
| 3,908,111 A | * | 9/1975 | Du Bois et al. | ........ | 99/331 X |
| 4,138,606 A | * | 2/1979 | Brown | ........ | 219/442 |
| 4,995,312 A | * | 2/1991 | Leiros | ........ | 99/411 |
| 5,029,519 A | * | 7/1991 | Boyen | ........ | 99/341 |
| 5,400,700 A | * | 3/1995 | Bois | ........ | 99/403 |
| 5,794,522 A | * | 8/1998 | Bois et al. | ........ | 99/330 |
| 6,125,737 A | * | 10/2000 | Chang | ........ | 99/331 |
| 6,172,339 B1 | * | 1/2001 | Thevenin | ........ | 99/329 R |
| 6,341,555 B1 | * | 1/2002 | Chang | ........ | 99/337 |

FOREIGN PATENT DOCUMENTS

| | | |
|---|---|---|
| DE | 27 24 713 A1 | 12/1978 |
| FR | 2 530 935 A1 | 2/1984 |
| GB | 2 205 731 A | 12/1988 |
| JP | 04-272718 A | 9/1992 |
| JP | 09-326293 A | 12/1997 |

\* cited by examiner

Primary Examiner—Timothy F. Simone
(74) Attorney, Agent, or Firm—Browdy and Neimark, P.L.L.C.

(57) ABSTRACT

An electric cooking appliance, such as a fryer, having a receptacle provided to receive a cooking liquid, the receptacle being disposed at least partially in a casing having a lateral wall, and an electric connector mounted in an opening of the lateral wall of the casing, the electric connector being provided to cooperate with a mating electric connector connected at the end of a power supply cord. The lateral wall of the casing has an outer rim disposed above the opening, creating a conduit, or trough, that is arranged to keep any liquid that is flowing along the lateral wall of the casing at a distance from the electric connector mounted in the casing.

16 Claims, 2 Drawing Sheets

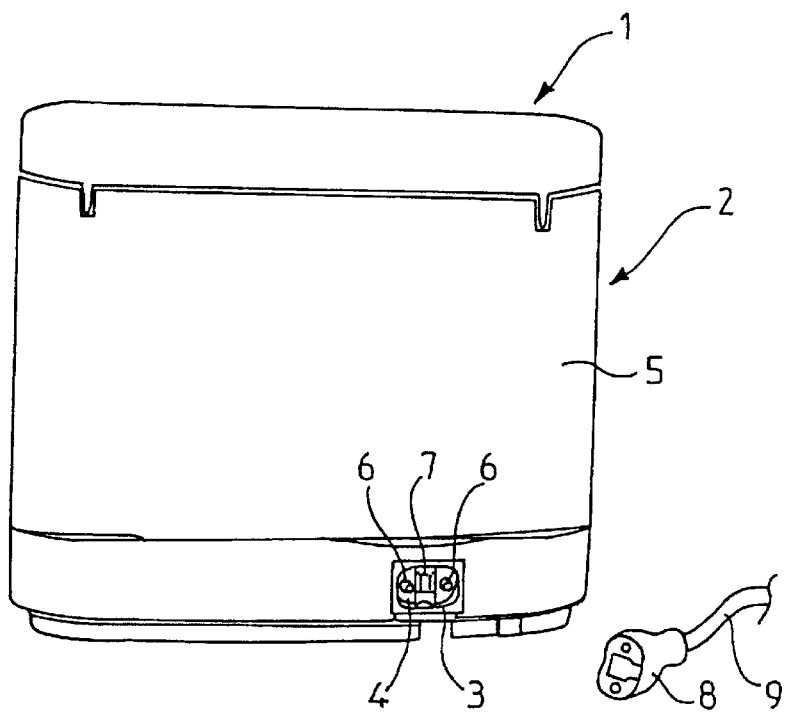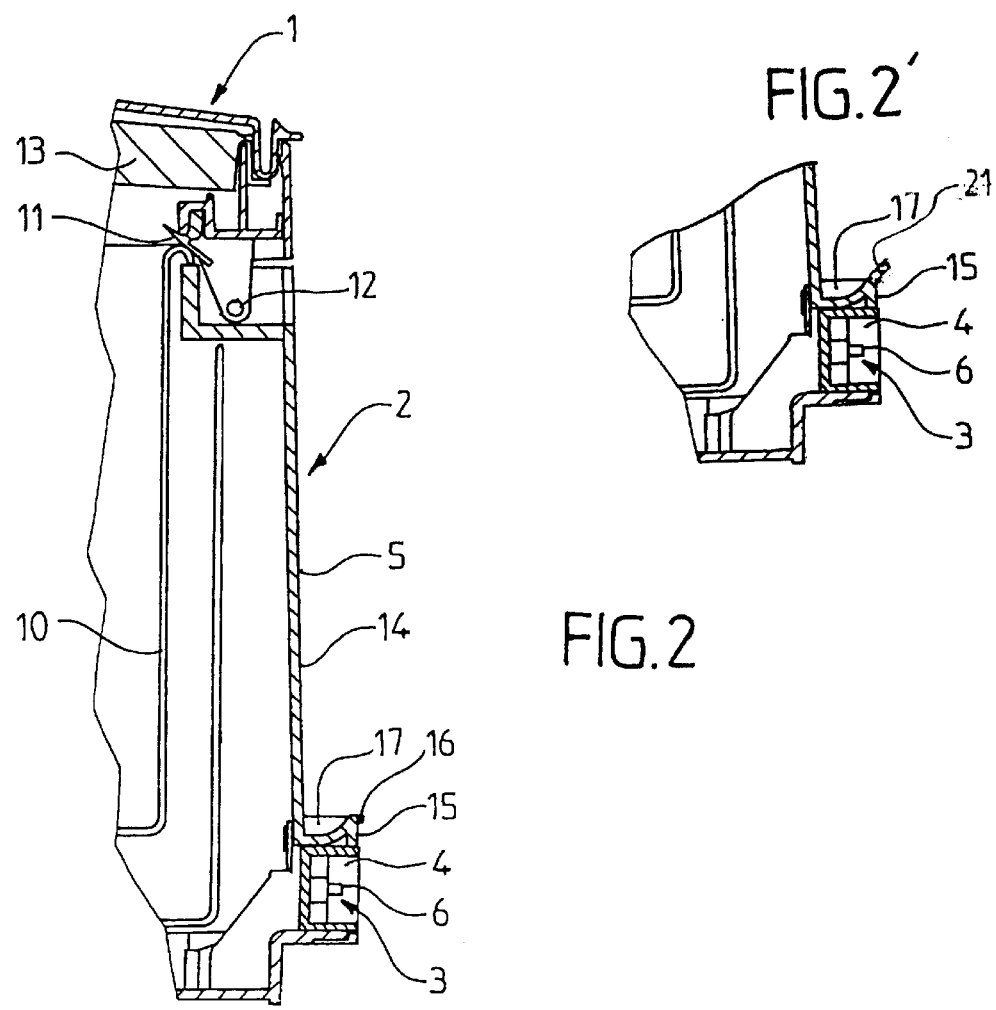

ELECTRIC COOKING APPLIANCE HAVING AN ELECTRIC CONNECTOR AT THE OUTSIDE OF THE CASING

BACKGROUND OF THE INVENTION

The present invention relates to the general field of electric cooking appliances having a receptacle, such as a tank or bowl, for containing liquids, and relates in particular, but not exclusively, to electric fryers or electric cookers intended for cooking rice or pasta.

Generally, such appliances have a casing that encloses the receptacle and a lid that includes a joint, or seal, provided to limit the passage of vapor or liquid between the lid and the receptacle. However, the appearance of droplets of condensed liquid at the outside of the enclosure formed by the receptacle when it closed by the lid can provoke either a break in the seal between the receptacle and the lid when the lid is closed, or a flow of liquid that ours during or after opening of the lid. In an appliance having a casing with lateral walls that are intended to remain cool, i.e. to reach a maximum temperature that is less than 100° C., droplets of condensed liquid flowing along the outer face of the lateral walls can reach the bottom of those walls. Such flows are particularly troublesome when the system for supplying electric power to the appliance includes a male electrical connector that is mounted in the casing and to which can be connected a female electric connector attached to a power supply cord.

Moreover, liquid can overflow the receptacle during cooking, even in the absence of a lid and/or in the absence of cool lateral walls. Such overflows are equally particularly troublesome when the power supply system includes an electric connector, generally male, in the casing, to which can be connected a mating electric connector, generally female, that is secured at the end of a power supply cord.

BRIEF SUMMARY OF THE INVENTION

The present invention provides an electric cooking appliance, such as fryer, which permits these drawbacks to be avoided.

More specifically, the invention provides an electric cooking appliance, such as a fryer, having a receptacle provided to receive a cooking liquid, the receptacle being disposed at least partially in a casing having a lateral wall, and an electric connector mounted in an opening of the lateral wall of the casing, the electric connector being provided to cooperate with a mating electric connector connected at the end of a power supply cord. According to the invention, the lateral wall of the casing has an outer rim disposed above the opening, creating a conduit, or trough, that is arranged to keep any liquid that is flowing along the lateral wall of the casing at a distance from the electric connector mounted in the casing.

During cooking, liquid or vapors can escape from the receptacle and arrive, possibly after having condensed, on the upper part of the outer face of the lateral wall of the casing. The liquid then flows under the force of gravity along the lateral wall until reaching the conduit. In other words, the wall that joins the outer rim to the lateral wall has a concave cross section. The rim being placed above the opening, the connector mounted in the casing is effectively protected against possible liquid flows. The statement that the liquid is kept at a distance encompasses both containing collected liquids and deflecting collected liquids. The connector mounted in the casing is usually a male connector. If desired, the connector in the casing can include a ground pin or plug.

Advantageously then, the lateral wall of the casing has an upper part, disposed above the opening, and a lower part in which the opening is formed, the outer rim and the upper part of the lateral wall together forming the conduit. The upper part and the lower part may or may not be made of a single piece.

According to an advantageous form of construction, the appliance is constructed so that, during cooking, the temperature of the outer face of the upper part of the lateral wall is maintained below 100° C. With this arrangement, the invention effectively prevents adverse consequences resulting from the flow of condensed liquids downwardly along the outer face of the lateral wall.

According to an advantageous form of construction, the connection between the two electric connectors is effected with the aid of magnetic attraction. The invention offers particular benefits when the appliance is equipped with connectors that utilize magnetic attraction since the freedom of movement allowed between the casing and the electric connector that is attached to the power cord makes it more difficult to maintain a fluid tightness between the casing and that connector than in the case of plug and socket connectors.

Advantageously, the conduit presents, above the opening, a base that slopes downwardly in the direction of at least one of the lateral sides of the opening. This arrangement permits the retention of liquid above the connector to be avoided, which is particularly advantageous if the receptacle should overflow. Liquid flows that are thus guided out of the zone of the conduit above the opening can be directed into a receiving cavity provided on or in the casing, and/or can be allowed to flow onto the working surface on which the appliance has been placed.

Advantageously, the outer rim is formed from a single piece that also forms at least a part of the casing. This permits a reduction in the cost of fabrication and also facilitates cleaning by eliminating irregularities that exist where two pieces are connected together.

Advantageously then, the conduit is disposed behind the lower part of the lateral wall of the casing. In other words, the outer rim forms the upper edge of the lower part of the lateral wall of the casing. This arrangement permits a more solid construction of the conduit to be obtained.

Advantageously, the outer rim is formed to provide a cavity for receiving overflowing liquid. This arrangement assures that such overflows will not reach the working surface on which the appliance is placed.

Advantageously then, the cavity for receiving overflows has a low point arranged at a lateral distance from the opening. This arrangement permits overflows to be retained at a distance from the connector.

Advantageously also, the outer rim has a low point provided at a lateral distance from the opening, to prevent overflows from reaching the electrical connector in case of substantial overflows, particularly in the case of liquid boiling over from the receptacle.

Advantageously also, the appliance includes a lid pivotally mounted on the casing about a pivot arranged between the receptacle and a face of the casing containing the opening. This arrangement particularly permits collection of overflows of condensates occurring at the rear of the lid, which constitute substantial volumes, and to protect the electrical connector, which is most often placed at the rear of the appliance.

The outer rim provides a distance greater than 0.3 cm with the upper part of the lateral wall of the casing, and preferably greater than 1 cm. In other words, the width of the conduit is greater than 3 mm. These arrangements facilitate cleaning of the zone for receiving overflows.

Advantageously, the conduit has one or several coupling radii greater than 1 mm between the outer rim and the upper part of the lateral wall of the casing. This also helps to facilitate cleaning of the zone for receiving the overflows.

BRIEF DESCRIPTION OF THE DRAWING

FIG. 1 is an elevational view of the rear of a cooking appliance according to the invention, associated with an electric power cord having a magnetic connector.

FIG. 2 is a partial cross-sectional view of the appliance of FIG. 1 in a vertical plane passing through the connector.

FIG. 2' is a cross-sectional detail view showing a modification of a part of the lower portion of the appliance of FIGS. 1 and 2.

DETAILED DESCRIPTION OF THE INVENTION

Figure 3:
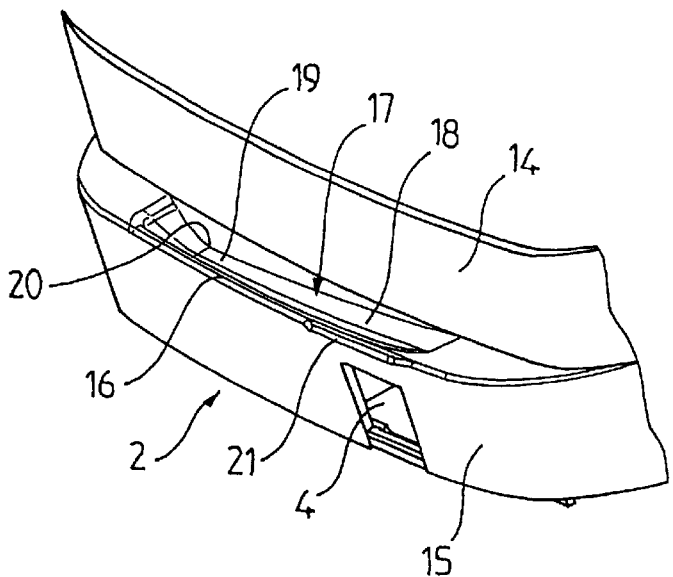
FIG. 3 is a perspective view of a lower portion of the rear of the appliance having the modification shown in FIG. 2'.

FIG. 1 shows the rear face of an electric cooking appliance, such as a fryer, according to the invention, the appliance being composed basically of a lid 1 that is pivotally mounted on a casing 2. A male electric connector 3 is housed in an opening 4 provided in a lateral wall 5 of casing 2. Male electric connector 3 has two electric connections pins 6 as well as a magnet 7, provided to cooperate with a female electric connector 8 attached to one end of an electric power supply cord 9. In this embodiment, the connection between connectors 3 and 8 is effectuated with the aid of a magnetic attraction. However, the connection between the connectors can equally be effectuated by other means, such as by a conventional plug and socket unit in which pins, or blades, of a male connector are inserted into, and elastically gripped by, slots of a female connector.

A receptacle, such as a tank or bowl, 10 is disposed in casing 2, as shown in FIG. 2. A conventional device for heating the receptacle, not shown in the drawings, is provided. A sealing joint 11 is mounted in the lower face of lid 1 to provide a fluid type connection between lid 1 and receptacle 10 during cooking. Lid 1 is pivoted on casing 2 about a pivot axis 12 disposed between receptacle 10 and the rear face of casing 2, which rear face is provided with opening 4 in which a connector is housed. A filter cartridge 13 is installed in lid 1.

Lateral wall 5 of casing 1 has a lower part 15 in which opening 4 housing connector 3 is disposed, and an upper part 14. An outer rim 16 is disposed above opening 4. In the illustrated embodiment, outer rim 16 is an integral part of upper part 14 and forms, together with the lower end of upper part 14, a conduit or trough 17 that is formed to keep any liquid that may flow downwardly along the outer surface of upper part 14 away from pins 6. Conduit 17 is disposed behind lower part 15 of lateral wall 5 and, in the illustrated embodiment, is also integral with upper part 14. Rim 16 is thus formed from the same piece that forms lateral wall 5, obtained for example by molding. Preferably, the appliance is constructed so that during a cooking operation the temperature of the outer face of upper part 14 remains below 100° C.

As is shown more clearly in FIG. 3, conduit 17 has a base 18 located above opening 4. Base 18 is inclined downwardly in a direction away from opening 4, and in particular away from one of the lateral sides of opening 4. Thus liquid overflows collected in conduit 17 are transported to a distance away from the electrical connector. Edge 16 and base 18 define a cavity 19 for receiving and retaining liquid, that cavity having a low point 20 that is remote from the pins of the electrical connector. Rim 16 can be further provided with an additional rib 21, also shown in FIG. 2', that extends outwardly and is located directly above opening 4. In order to facilitate cleaning of conduit 17, rim 16 is disposed at a distance of the order of 1.5 cm from upper part 14 of lateral wall 5 and the zones of connection between rim 16 and upper part 14 of lateral wall 5 have radii of curvature of the order 2 mm.

Conduit 17 permits liquid that may flow downwardly along upper part 14 of the lateral wall to be collected. This liquid will be gathered in cavity 19. The geometry of conduit 17 and of cavity 19 permit easy cleaning, for example by means of a sponge.

Figure 4:
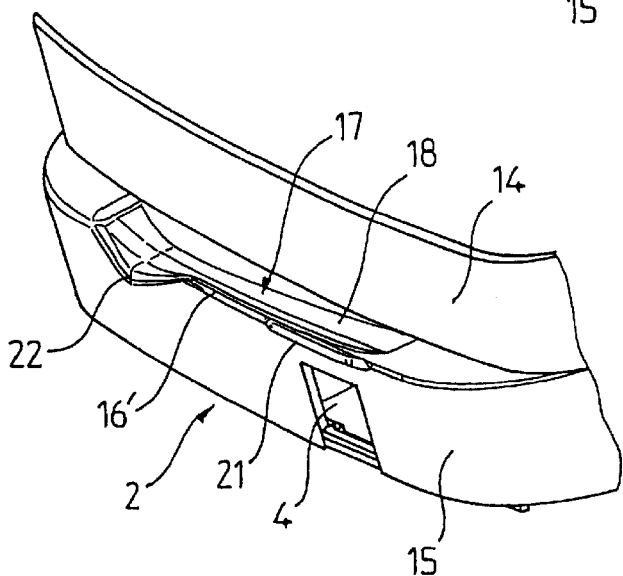
FIGS. 4 and 5 are views similar to that of FIG. 3 showing two alternative forms of construction according to the present invention.

A modified form of construction of an appliance according to the invention is shown in FIG. 4. Here, rim 16' is formed to have a low point 22 spaced laterally from opening 44. Low point 16' allows liquid to flow out of conduit 17.

Figure 5:
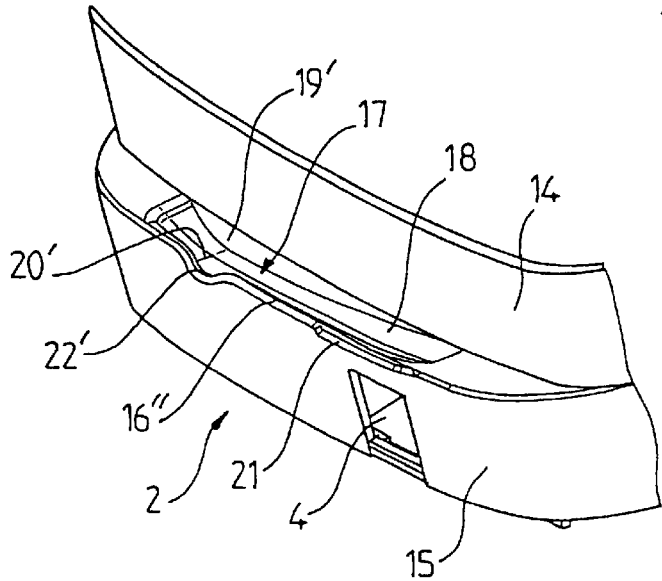

According to another variation, shown in FIG. 5, there can be provided a rim 16" having a low point 22', while there is provided a cavity 19' having a low point 20'. Low point 20' and the portion of base 18 that extends past low point 22' will be below low point 22'. This arrangement permits liquid that may flow during normal functioning of the appliance to be collected in conduit 17, while assuring continued protection of the electric connector if substantial quantities of liquid should flow down the outer surface of upper part 14, for example as a result of liquid boiling over.

According to another possible variation, the conduit can be provided, above the opening housing the connector, with a base having sides that are inclined downwardly in the direction of each of the lateral sides of the opening housing the male electric connector.

According to another possible modification, the rim of conduit 17 can be formed by a gutter disposed on the lateral wall of the casing. Preferably, the gutter is inclined toward one or each of the lateral sides of the opening housing the male electrical connector.

According to yet another variation, the rim of conduit 17 can be attached to the lateral face of the casing.

In various forms of construction of an appliance according to the invention, the casing does not necessarily completely surround the periphery of the receptacle.

Furthermore, the rim of conduit 17 can extend around the entire periphery of the casing, or only along one or several parts of the periphery. The rim of conduit 17 can be disposed at a distance of the order of 0.5 to 5 cm above the opening, or can be disposed at a greater distance.

In the fabrication of a cooking appliance according to the invention, the entirety of the casing 2 may be constituted by a single molded piece of plastic material. Alternatively, at least one, more than one, or all of the following components can be made of plastic material: lateral wall 5 (of the casing), upper part 14 (of lateral wall 5), 20 lower part 15 (of lateral wall 5), edge 16, 16', conduit 17, base 18, additional rib 21.

This application relates to subject matter disclosed in French Application Number 01 03850, filed Mar. 21, 2001, the disclosure of which is incorporated herein by reference.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. An electric cooking appliance comprising:
   a casing having a lateral wall provided with an opening;
   an electric connector mounted in said opening of said lateral wall of said casing, said electric connector being configured to cooperate with a mating electric connector connected at the end of a power supply cord; and
   a receptacle provided to receive a cooking liquid, said receptacle being disposed at least partially in said casing;
   wherein said lateral wall of said casing has an outer rim disposed above said opening, said outer rim being configured to form a conduit that is arranged to keep any liquid that flows along said lateral wall of said casing at a distance from the electric connector mounted in said opening.

2. The appliance of claim 1, wherein said lateral wall of said casing has an upper part, disposed above said opening, and a lower part in which said opening is formed, said outer rim and said upper part of said lateral wall together forming said conduit.

3. The appliance of claim 2, wherein said appliance is constructed so that, during cooking, the temperature of the outer face of said upper part of said lateral wall is maintained below 100° C.

4. The appliance of claim 2, wherein said conduit is disposed behind said lower part of said lateral wall.

5. The appliance of claim 2, wherein said outer rim is spaced at a distance greater than 0.3 cm from said upper part of said lateral wall.

6. The appliance of claim 2, wherein said outer rim is spaced at a distance greater than 1.0 cm from said upper part of said lateral wall.

7. The appliance of claim 2, wherein said conduit has at least one coupling radius greater than 1 mm between said outer rim and said upper part of said lateral wall.

8. The appliance of claim 1, further comprising a magnetic element for holding the electric connectors in a connected condition.

9. The appliance of claim 1, wherein said opening has lateral sides and said conduit presents, above said opening, a base that slopes downwardly in the direction of at least one of the lateral sides of said opening.

10. The appliance of claim 1, wherein said outer rim is formed from a single piece that also forms at least a part of said casing.

11. The appliance of claim 1, wherein said outer rim is formed to provide a cavity for receiving overflowing liquid.

12. The appliance of claim 11, wherein said cavity has a low point arranged at a lateral distance from the opening.

13. The appliance of claim 1, wherein said outer rim has a low point provided at a lateral distance from the opening.

14. The appliance of claim 1, further comprising a lid pivotally mounted on said casing about a pivot arranged between said receptacle and said lateral wall of said casing containing said opening.

15. The appliance of claim 1 constituted by an electric fryer.

16. The appliance of claim 1 wherein said rim has an upwardly extending outer edge and said conduit has the form of a trough.

* * * * *